Nov. 2, 1943.  I. B. HUMPHREYS  2,333,424
LUBRICATED VALVE
Filed Feb. 2, 1943  2 Sheets-Sheet 1
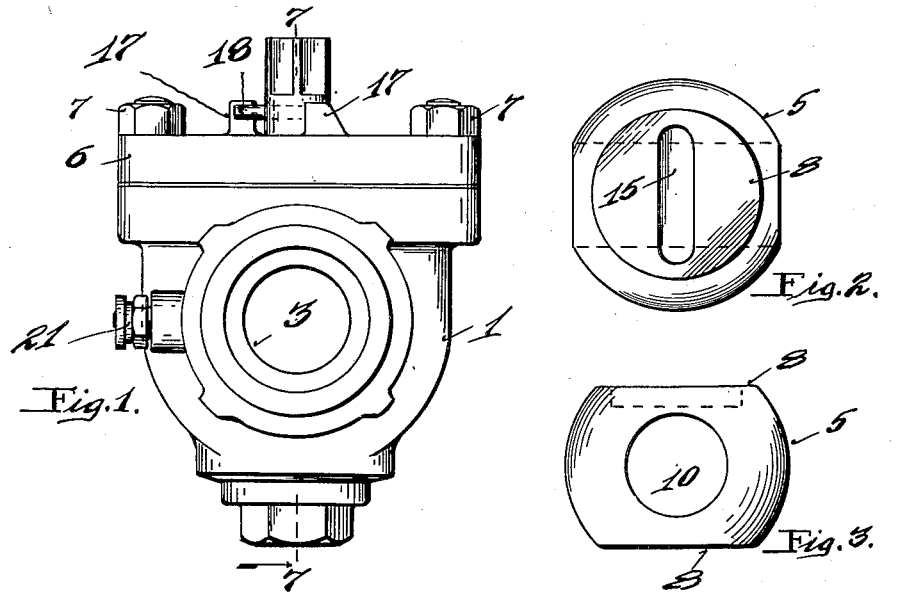
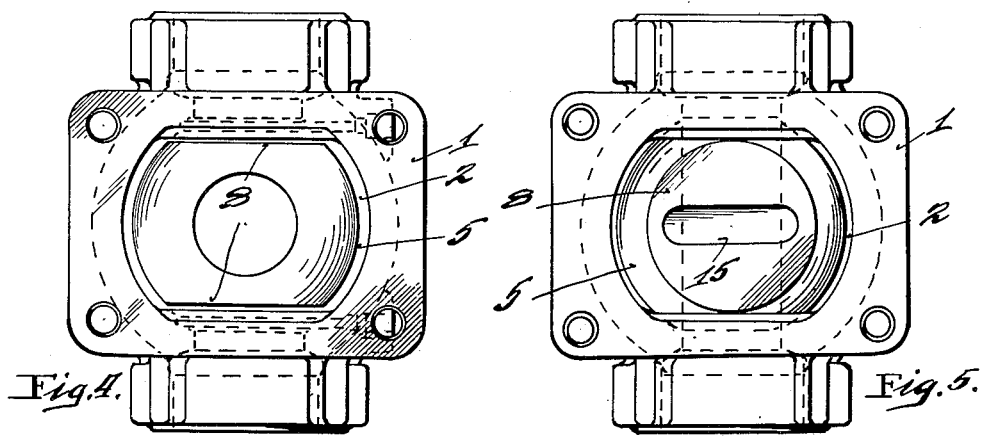
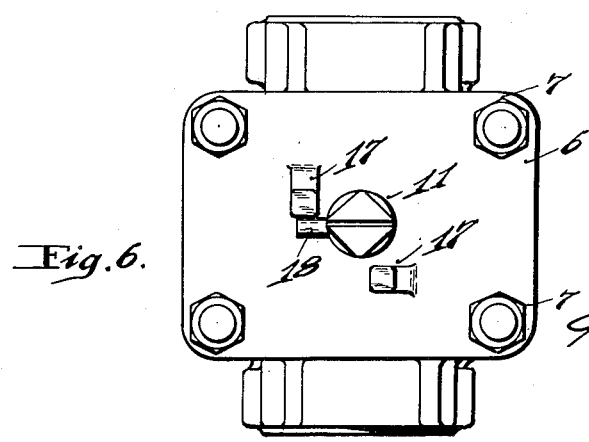
INVENTOR.
Ira B. Humphreys Patented Nov. 2, 1943

2,333,424

UNITED STATES PATENT OFFICE 2,333,424

LUBRICATED VALVE

Ira B. Humphreys, Denver, Colo.

Application February 2, 1943, Serial No. 474,458

4 Claims. (Cl. 251—113)

This invention relates to improvements in valves, particularly to the rotatable ball or spherical type for quick opening and closing.

The valve, of spherical form, has a passage therethrough, transverse to the normal control axis of rotation, preferably for establishing a full area, direct and unobstructed communication between the inlet and outlet passages in the valve body, when in registry in the fully open position of the valve. The spherical surface of the valve is in a constant relation with a pair of opposing seats or seat surfaces in the valve body, respectively, at inner terminals of the inlet and outlet passages, and between which the valve is disposed, adapting either of the body passages to serve alternately for inlet or outlet.

The valve, therefore, is constantly guided by and in coaction with the opposing seats, thereby avoiding any binding possibilities during valve rotation.

The valve, in a closed position, covering both of the opposing seats and being adapted to move or yield laterally can be compressed by the incoming pressure against the seat of the outlet side, effecting a firm seating of the valve, and therefore adaptable for high pressure service.

The valve, in addition, may also be referred to as of a lubricated type, wherein both seats embody, respectively, an annular central lubricant passage, the lubricant therein materially aiding in establishing and maintaining a seal and reducing and resisting wear.

An object of the invention is to provide a rotative valve of spheroid form for disposal and cooperation with a pair of opposing valve seats and between which it is normally confined, guided and sustained, and having a pair of plane surfaces lateral to the normal controlling axis of rotation or of reduced cross-sectional dimension, adapting the valve upon rotation transverse to its control direction to be freed from its cooperative position and confinement between the seats for its insertion or removal from the valve body or casing.

Another object is to provide a rotatable valve of spheroid form having a passage extended therethrough to control communication between the inlet and outlet openings or ports of the valve body, the valve in constant cooperation with opposing valve seats and guidingly confined and sustained thereby, and in its closed position, sealing both inlet and outlet openings of the valve body, and in providing for an annular distribution of lubricant to each of the seats to reduce friction to valve rotation, resistance to wear and enhance sealing when the valve is closed.

It is another object to provide a valve of simple construction and operation, easy to assemble and disassemble, strong and durable, capable of withstanding high fluid pressures and highly efficient.

Further objects and advantages will be more fully set forth in the following description of the accompanying drawings forming a part thereof, illustrating a preferred embodiment of the invention, and in which:

Figure 1 is an end of the valve body.

Figure 2 is a top plan view of the rotatable valve.

Figure 3 is a side elevation thereof.

Figure 4 is a top plan view of the valve body with the top cap or bonnet removed to expose the valve, set in a position for its removal or insertion.

Figure 5 is a view similar to Figure 4, with the valve shifted to its operative position, cooperating with and confined by opposing seats.

Figure 6 is a top plan view of the valve.

Figure 7:
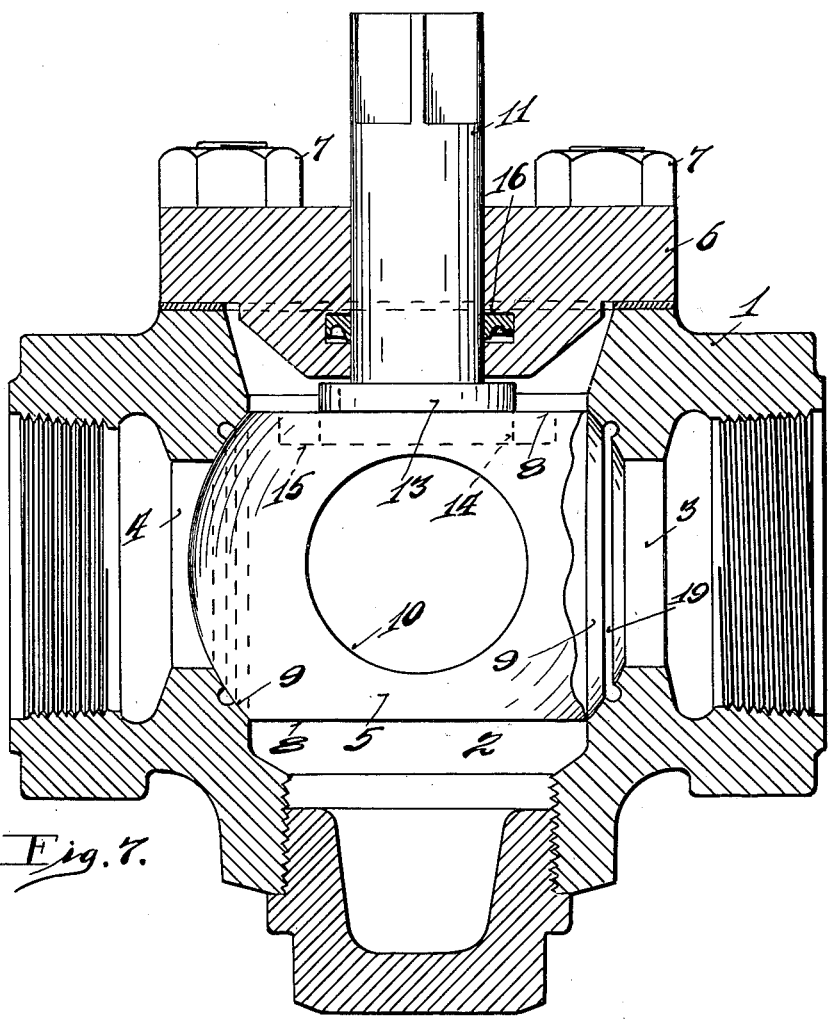
Figure 7 is an enlarged section on line 7—7, Figure 1.
Figure 8:
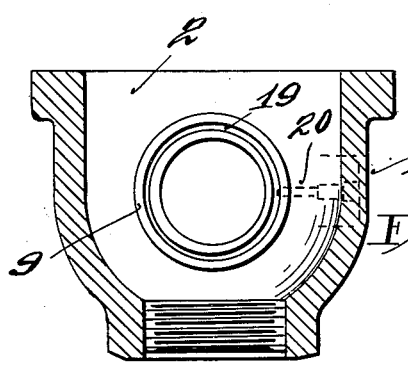
Figure 8 is a central section crosswise through the body.

Referring to the drawings, 1 indicates the valve body or casing having a central valve chamber 2, and a pair of opposing passages or ports 3, 4, relatively as an intake and an outlet, the ports, however, are not limited to any specific direction of fluid flow. The ports, as shown, are threaded, as a conventional method for making service pipe connections to interpose the valve in a pipe line.

The casing or body is provided with a top opening into the valve chamber for the introduction of the rotatable valve 5, the opening covered and sealed by a cap 6 fixed to the body by a series of bolts 7.

The rotatable valve 5 is of spheroid form with planar top and bottom ends, 8, 8, to reduce its vertical or height dimension, adapting the valve when appropriately shifted to be inserted and removed from the body through the top opening thereof.

The spherical portion of the valve in its normal position within the body is confined and interfittingly bears against opposing seats 9, 9, respectively, as terminals for the inlet and outlet ports 3 and 4, and with which the valve cooperates for controlling the flow of fluid through said ports. A passage 10 extends through the valve, preferably cylindrical in form, and of a diameter approximate to that of the inlet and outlet ports, which in the open position of the valve are in registry and direct communication to afford an uninterrupted passage of the fluid therethrough. The spherical portion of the valve marginally borders the opposite ends of the passage 10 for a bearing contact with the seats when the valve is in open position and in a closed position covers and seals both ports.

The interfitting engagement of the valve with the seats, while confining and sustaining the valve in its normal position within the valve body, provides for a constant bearing contact in any position of the valve, and is constantly guided in its rotative control movement. This obviates any possibility of obstruction to the valve movement, and thereby materially reduces wear to the contacting surfaces, leaving no opportunity for any shearing action of the edges of the passage through the valve in moving across the seat surface during a valve controlling movement.

The seats being relatively stationary, and the valve being wholly sustained by the seats, the valve is only free to rotate about a vertical axis in its control rotation regardless of any pressure of side thrust on the valve created by the fluid being controlled, although free to yield more compressively against one seat over that of the other according to the direction that the pressure is applicable. The valve is slidably sustained against any lateral shift through its connection with the inner end of the operating stem 11, journalled in the cap 6 which it traverses to extend exteriorly of the body for access. The inner or lower end of the stem is provided with an annular flange 13 having a bearing contact against the upper plane surface 8 of the valve to guidingly sustain the valve against any transverse shift or tilting. The lower side of the flange, and centrally thereof, has a transversely extending key 14, engaging into an elongated slot or recess 15 in the top surface of the valve for establishing a coupling connection therewith and non-interfering to sidewise shift of the valve from one seat toward another, allowing said self-centralization of the valve within the seats and rotative with the stem.

The shank of the stem exterior of the body preferably is provided with a pin 18 extending laterally thereof to alternately engage stops 17, 17, on the cap to limit rotation of the stem within ninety degrees for opening and closing the valve. The shank of the stem extends through a stuffing box 16 in the cap, and its outer end is squared or otherwise formed to removably receive a wrench or operating handle.

To further enhance the sealing efficiency of the valve, and to avoid or reduce any frictional drag between the members, as would prevent easy rotation of the valve, the seats annularly and centrally thereof, each is provided with a lubricant distributing groove 19 in connection with a supply duct 20 extending through the body, and at its outer end equipped with a conventional or commercial check valve control force feed lubricant receiving nipple or fitting 21 to which lubricant supply connection can be readily made for administering a replenishing supply of lubricant at any time irrespective of the control position of the valve, for the seats are completely covered in both opened and closed positions.

To insert or remove the valve into or from the body, it is positioned to bring the plane surfaces 8, 8, adjacent to or parallel with the inner ends of the seats, as its dimension is reduced to slide between the seats and free from contact therewith. In such position the valve duct or passage is perpendicular to the ports in the body. For insertion, after the valve has been slipped between the seats as shown in Figure 4, the spherical portion can be readily brought into cooperation with the seats by rotating the valve transversely to bring the plane surfaced ends from a vertical position, with the recessed end uppermost to be engaged by key end of the stem, and conversely for removing the valve, it is rotated from its normal position within the seats as shown in Figure 5 to the position shown in Figure 4.

Having described my invention, I claim:

1. A valve, comprising: a valve body having a valve chamber opening to the top side of the body and opposing ports respectively relatively at opposite sides of the chamber, opposing seats within the body, each respectively as an inner terminal for a port and having a seat surface to accommodate a spherical valve surface, a rotative valve of spheroid form normally guidingly confined and rotatively sustained within and between said seats for sealing said ports in a closed position of the valve and having a passage therethrough for registry with said ports in the open position of the valve, the valve, transversely, of a reduced dimension less than the spacing of the seats to free the valve from the seats upon rotation in a direction counter to the normal control direction, for its introduction or the removal of the valve from the chamber.

2. A valve, comprising: a valve body having a valve chamber accessible through the casing and a pair of ports respectively relatively for inlet and outlet service, seats within the body, each respectively as an inner terminal for a port having a seat surface to accommodate a spherical valve surface, a rotative valve of spherod form normally guidingly confined and rotatively sustained within and between said seats for cooperation therewith to seal said ports in a closed position of the valve, and having a passage therethrough for registry with said ports in an open position of the valve, the valve having plane surfaces lateral to the normal control axis of rotation for a reduction in dimension adapting the valve to be non-cooperatively slipped between the seats for its insertion and removal.

3. A valve, comprising: a valve body having a valve chamber and opposing ports respectively relatively at opposite sides of the chamber, opposing seats within the body, each respectively as an inner terminal for a port, and having a seat surface to accommodate a spherical valve surface, a rotative valve of spheroid form with flat top and bottom ends, normally guidingly confined and rotatively sustained within and between said seats for cooperation therewith, said valve movable in an arc converse to its normal arc of rotation for bringing the ends relatively adjacent said seats to insert and remove the valve to and from the seats and valve body through a cap sealed opening in the body.

4. A valve, comprising: a valve body having a valve chamber and opposing ports respectively relatively at opposite sides of the chamber, opposing seats within the body, each respectively as an inner terminal for a port, and having a seat surface to accommodate a spherical valve surface, a rotative valve of oblate spherical form, the spherical surface normally guidingly confined and rotatively sustained within and between said seat for cooperation therewith, said valve movable in an arc converse to its normal arc of rotation to insert and remove the same to and from the seats and valve body through a cap sealed opening in the body.

IRA B. HUMPHREYS.